(12) United States Patent
Herin

(10) Patent No.: US 8,126,924 B1
(45) Date of Patent: Feb. 28, 2012

(54) METHOD OF REPRESENTING AND PROCESSING COMPLEX BRANCHING LOGIC FOR MOBILE APPLICATIONS

(75) Inventor: Paul M. Herin, Castle Rock, CO (US)

(73) Assignee: Countermind, Littleton, CO (US)

( * ) Notice: Subject to any disclaimer, the term of this patent is extended or adjusted under 35 U.S.C. 154(b) by 593 days.

(21) Appl. No.: 12/176,992

(22) Filed: Jul. 21, 2008

Related U.S. Application Data

(60) Provisional application No. 60/951,126, filed on Jul. 20, 2007.

(51) Int. Cl.
*G06F 7/00* (2006.01)
*G06F 17/30* (2006.01)

(52) U.S. Cl. ........................................ 707/791; 707/796

(58) Field of Classification Search ............ 707/600–81; 717/137; 725/62, 63; 702/182, 183, 188; 700/108; 455/432.1, 432.2
See application file for complete search history.

(56) References Cited

U.S. PATENT DOCUMENTS

| 2002/0144233 A1* | 10/2002 | Chong et al. | 717/105 |
| 2004/0214576 A1* | 10/2004 | Myers et al. | 455/445 |
| 2005/0015357 A1* | 1/2005 | Shahidi | 707/1 |

OTHER PUBLICATIONS

Luciano Baresi et al., Workflow Partitioning in Mobile Information Systems, Google Scholar, 2005, 14 pages.*

* cited by examiner

*Primary Examiner* — Jean B Fleurantin
(74) *Attorney, Agent, or Firm* — Marsh Fischmann & Breyfogle LLP

(57) ABSTRACT

A system is provided for efficiently defining and navigating through complex workflow structures for mobile unit applications. In one embodiment, the system (100) includes business platforms (101), a mobility server (102), an application descriptor generator (103) and mobile units (104). The business platforms (101) may be existing data systems of a business entity. The mobility server (102) handles communications between the business systems (101) and the mobile units (104). The application descriptor generator (103) creates application descriptors that define the functionality of an application running on a client (108) of the mobile unit (104). This functionality may include complex branching logic. In this manner, applications can be rapidly deployed and readily adapted to meet the needs of a business entity.

9 Claims, 6 Drawing Sheets

METHOD OF REPRESENTING AND PROCESSING COMPLEX BRANCHING LOGIC FOR MOBILE APPLICATIONS

CROSS-REFERENCE TO RELATED APPLICATION

This application claims priority and the benefit of the filing date under 35 U.S.C. 119 to U.S. Provisional Application No. 60/951,126, entitled, "Method of Representing and Processing Complex Branching Logic for Mobile Applications," filed on Jul. 20, 2007, the contents of which are incorporated herein as if set forth in full.

FIELD OF THE INVENTION

The present invention relates to developing and executing applications for mobile units including handheld computers, laptop/notebook computers, tablet computers, PDAs, and smartphones and, in particular, to enabling mobile units operating over various wired and wireless networks, and associated mobility server platforms, to deploy and execute applications that include complex branching logic for more efficient automation of diverse business work processes related to mobile and wireless data collection. Unlike previous approaches to mobile application development and operation, this invention provides for more complex process flow and is highly optimized to operate in environments with large number of mobile users operating with unpredictable network connectivity.

BACKGROUND OF THE INVENTION

Mobile units are used in many business application areas including applications related to data collection by field-based workers. Examples include business processes related to tracking and documenting product deliveries, tracking asset inventories, recording data related to quality inspections, recording data related to tasks performed during a manufacturing process, and recording data related to parts consumed and labor delivered while servicing customers. These work process automation and data collection activities span across many industries including manufacturing, healthcare, logistics, and service industry sectors. In many cases, the mobile unit exchanges data with one or more existing customer business systems or data repositories. In this regard, the mobile unit invention may maintain a real-time wireless connection to the network, or may periodically connect to the network for data exchange.

There are a number of challenges that are peculiar to or are exacerbated when automating business work flow processes with field based data collection on mobile units. For example, in many cases, mobile units are deployed in point-of-service applications where fast and efficient data entry and ready access to relevant data is important. Yet, mobile units and their resident applications often have limitations, e.g., in terms of screen size or performance for application presentation, that tend to constrain the quantity of user interface elements can be presented by the application at any one instant. Accordingly, there is a premium on efficient navigation through the work flow process and application and access to desired user interface elements for that step in the process.

In addition, it is desirable to provide rich functionality for mobile unit applications. For example, a service technician may make a number of service calls in connection with servicing a variety of issues for a number of different product types. In connection with each service call, the technician may use a mobile unit to access a service ticket that may include, for example, customer information, product and warranty information, and information describing the nature of the service call. During the service call, the technician may enter information relating to parts used, labor expended and other documentation concerning the service call. During or after the service call, this information may be used to update inventory, accounting or other enterprise data systems.

Some existing products addressing the automation of business work flow processes have used mobile units employing Internet based solutions. These solutions generally provide a browser at the user end, for instance on a mobile unit. Accordingly, a field user would access the browser on the mobile unit. This would send a hyper text transfer protocol (HTTP) request to a web server that would access a database or other business application, generate a response, and transmit that HTTP response to the mobile unit that would then display the information. Changes to the database or other business application would be handled similarly, with the mobile unit generating a HTTP request, transmitting this to a web server, the web server processing the request, and transmitting a return HTTP message back to the mobile unit.

Such web based solutions employing HTTP transfers and a browser are disadvantageous in that they require current connectivity to execute work flows. That is, if the browser on the mobile unit cannot connect to the proper server, for instance due to lack of cellular or WiFi coverage, the mobile unit cannot be used for desired work flow processing. Additionally, such a solution presents scalability issues in that the associated web server that must process the HTTP requests and responses has a finite load limit. Therefore, increased traffic on the web server, for instance due to a large number of employees conducting business, may slow or crash the web server causing inability to process business requests.

SUMMARY OF THE INVENTION

It will be appreciated that, in such contexts, the mobile unit should ideally support a broad range of work flow process, data entry, and data access situations, while providing the efficiency of operation as noted above. Moreover, it is desirable that the mobile unit capture and deliver data to the enterprise data systems in as useful a form as possible. All of these considerations suggest the need for a high level of application adaptability. However, it is often necessary to deploy such applications quickly and at low cost, and then to allow for frequent modification of the work flow and data fields, and other elements of the operating environment, as is typical in many mobile unit contexts.

The present invention allows for efficiently defining and navigating through complex work flow structures for mobile unit applications. In this manner, application developers can quickly and cost effectively deploy and modify applications with rich functionality tailored to specific application environments. In addition, mobile application users can efficiently navigate through the application so as to enhance, for example, real-time status of work performed, and efficiency of customer service delivery. Moreover, data can be transferred to enterprise data systems, in the form of self describing response data files, with data descriptions having detail reflecting the complexity of the work process and the specific path taken through the application by the user, thereby maximizing the potential usefulness of captured data.

In accordance with one aspect of the present invention, a method and apparatus ("utility") is provided for defining a child form list in connection with a mobile unit application. The mobile unit is associated with a mobility server operative for disseminating application descriptors that describe a functionality of an application for execution at one or more mobile units. The utility involves providing a client, resident on a mobile unit, for receiving application descriptors from the mobility server and, responsive to receipt of the application descriptors, establishing a device resident application having the noted functionality. In particular, the client is operative to establish a root form list, of one or more forms, defining a process flow structure for navigating through said application, where the root form list has a data content defined by the application descriptors.

In accordance with another aspect of the present invention, branching logic is defined in relation to alternate work flow processes associated with alternate form lists. In this regard, the client is operative to establish a root form list, of one or more forms, wherein one of those forms may also contain a link to a child form list, containing one or more forms. Additionally, the link to the child form list may only become active after a specific user input. Put another way, a user input on one of the forms of the root form list may activate a link, wherein the default process flow, which ordinarily would have proceeded on to the next form in the root form list, would instead follow a link to a child form list, thereby defining an alternate process flow structure. At the end of the child form list, the process flow may, for example, return to the root form list, such that the form that would have been next in the default process flow would be displayed after all the forms in the child form are completed.

It is to be understood that this process may be repeated many times at different form levels, such that a child form list may contain a form with a link to a grandchild form list. Such a relationship between a grandchild form list and a child form list would behave as did the child form list and the root form list previously discussed.

In one implementation, multiple parent forms can link to the child form list, and the data content of the child form list can vary depending on which parent form links to the child form list. Moreover, a single parent form can link to multiple instances of a form list defined by the application descriptors. A parent form can also link to multiple child form lists, where each child form list has a content defined by the application descriptors that is constant regardless of how the form list is linked. The client may also establish at least one predefined form list or singleton form in addition to the child form list, where the predefined form list has a data content that is independent of a linking relationship for accessing the predefined form list. The predefined form list may link to the child form list and vice versa.

The client may be further operative to establish a link from a component to at least one group of one or more detail information modules, where the component is a functional control (e.g., a button or textbox) and each detail information module controls a functionality of the component. One or more of these groups may include multiple detail information modules. The component may be linked to multiple groups of detail information modules. Moreover, at least one of the groups may include multiple instances of a given detail information module.

In accordance with another aspect of the present invention, a utility is provided for linking a component of a mobile unit application to multiple detail information modules. As described above, a client receives application descriptors from a mobility server and, responsive to receipt of the application descriptors, establishes a device resident application having a desired functionality. In this case, the client is operative to establish a link from a component to at least one group of multiple detail information modules, where the component is a functional control in each of the detail information modules and controls a functionality of the component. The component may link to multiple groups in this regard.

In accordance with a still further aspect of the present invention, a utility is provided that enables a customized mobile unit application. The utility involves providing a mobility server operative for disseminating one or more application descriptors to one or more clients, resident on one or more mobile units where the application descriptors describe a functionality of an application for execution at the one or more mobile units. In one implementation, the descriptors provide instructions for enabling a client at a mobile unit to establish a child form list, of one or more forms, defining a process flow structure for navigating through the application where the child form list has a data content defined by the application descriptors. In another implementation, the descriptors provide instructions to establish a link from a component to at least one group of multiple detail information modules, where the component is a functional control and each of the detail information modules controls a functionality of the component.

In accordance with another aspect of the present invention, a utility is provided for enabling a mobile unit to run multiple applications at the same time. As described above, the mobile unit is associated with a mobility server for disseminating application location descriptors to describe a functionality of an application for execution at the mobile unit. The utility involves operating the client to receive application descriptors from the mobility server and, responsive to receipt of the application descriptors, establishing a first application having a first functionality and one or multiple applications having a secondary functionality. The secondary functionality may be the same as or different from the first functionality. That is, the secondary application(s) may be a second instance of the first application or may be one or more separate applications. The utility further involves operating the client to run the first application and the secondary applications. It will be appreciated that only one of the applications may be used to control the mobile unit display even though both applications are running.

In accordance with a still further aspect of the present invention, a model/view/controller architecture is utilized for implementing mobile unit applications. The model manages the application descriptors, as described above, as well as the associated response data. The view manages the display of the model, and the controller manages both the view and the model, as well as coordinating how the two work together. In this manner, the noted complex process flows for a single or multiple applications can be effectively managed.

In accordance with a further aspect of the present invention, an auxiliary panel is employed within said client that enables a bifurcated view of the process flow structure. For example, while one form associated with a first process flow is displayed in a first area of the screen of the mobile unit, an auxiliary panel occupying a second portion of the screen of the mobile unit may be displaying a second form. This second form may be a form within the process flow structure being depicted in the first area, or may be a form wholly outside the process flow structure associated with the first form.

BRIEF DESCRIPTION OF THE DRAWINGS

For a more complete understanding of the present invention and further advantages thereof, reference is now made to the following detailed description taken in conjunction with the drawings in which.

DETAILED DESCRIPTION

Reference will now be made to the accompanying drawings, which at least assist in illustrating the various pertinent features of the present invention. In this regard, the following description is presented for purposes of illustration and description and is not intended to limit the invention to the form disclosed herein. Consequently, variations and modifications commensurate with the following teachings, and skill and knowledge of the relevant art, are within the scope of the present invention. The embodiments described herein are further intended to enable others skilled in the art to utilize the invention in such or other embodiments and with various modifications required by the particular application(s) or use(s) of the present invention.

Figure 1:
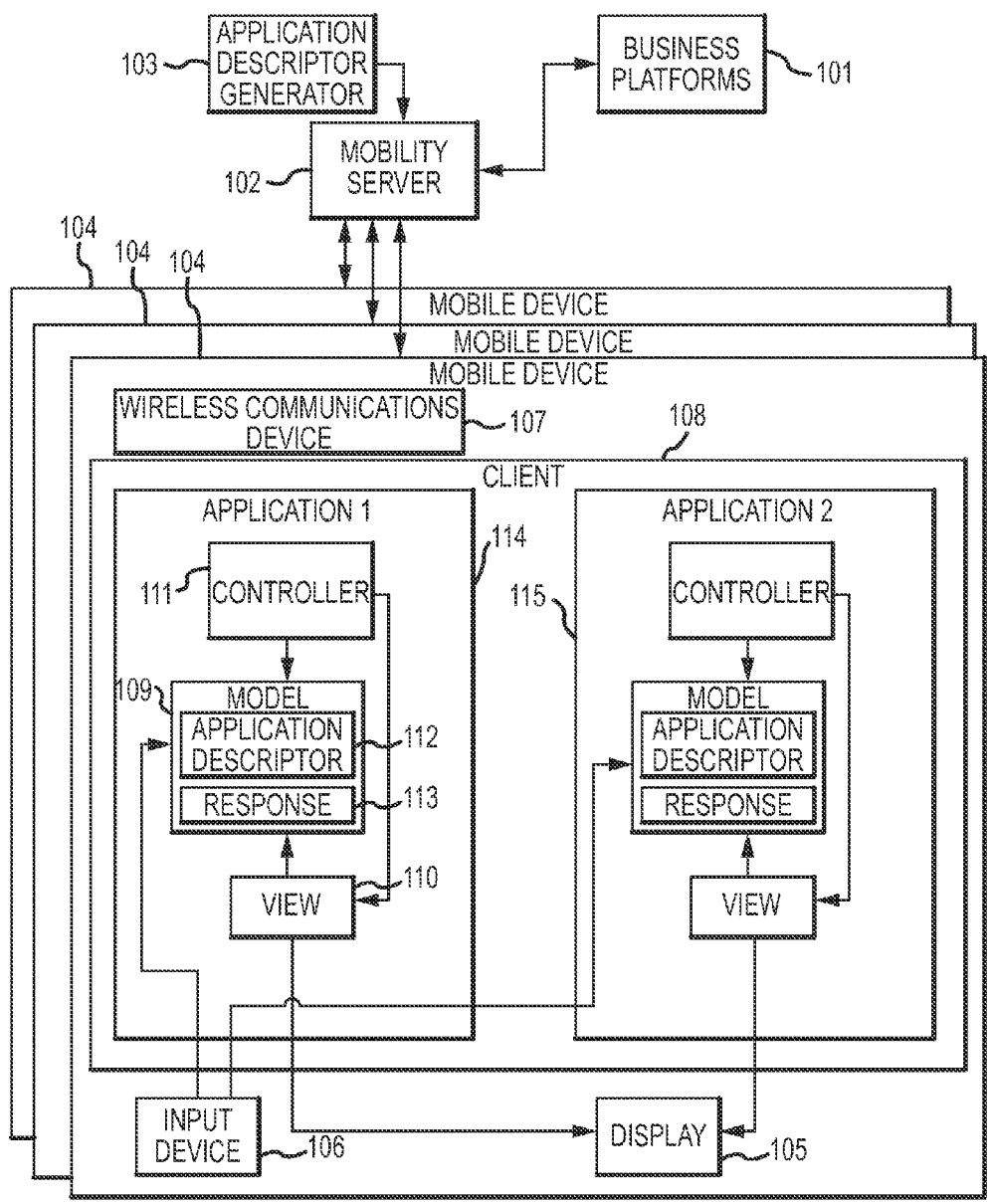
FIG. 1 is a block diagram of a mobile applications system in accordance with the present invention.

An exemplary system 100 in accordance with the present invention is shown in a block diagram in FIG. 1. The system 100 includes business platforms 101, a mobility server 102, an application descriptor generator 103 and mobile units 104 (only one shown in detail). It will be appreciated that the system 100 can support a large number of mobile units 104. The business platforms 101 may include computers, servers, or the like operative to manage, create, maintain, or otherwise process data associated with various business processes. This data may include data associated with human resources, security protocols, and other source business data, such as inventory levels, client records, standard operating procedures, billing information, statistical process control data, or any other data associated with a business role or function. The type and scope of business processes contemplated in the current embodiment include any business data that can be transmitted digitally via a mobility server.

The system 100 may be employed in a variety of business contexts. Thus, for example, the system 100 may be employed in executing transportation business processes. These processes may include, for example, completing pre-use and post-use truck inspections; completing load reconciliations; assigning, tracking, and recording deliveries, including tracking authorization or sign-off on delivered products; managing inventory or assets with barcode reading; and tracking real time delivery times and locations.

Alternatively, the system 100 may be employed in connection with manufacturing business processes. These processes may include, for example, manufacturing process monitoring, data collection, inventory management, part availability, scheduling, monitoring productivity, or the like. In yet another context, the system 100 may be used in conjunction with business platforms 101. These processes may include, for example, performing regulatory audits, performing asset audits, completing routine inspections of equipment or premises, and performing safety inspections.

In still another context, the system 100 may be used in conjunction with business systems 101 associated with one or more service business processes. These processes may include, for example, generating, accessing, and modifying work orders; tracking preventative maintenance; collecting data regarding installation; and performing emergency repairs. These service processes may further include addressing on-premise maintenance or equipment failure, emergency repair, field related maintenance, recording and managing inventory used for repair, assigning work to a technician or maintenance personnel, recording actual time worked on specific jobs, providing diagnostic steps to technicians for faster repair or maintenance, and using GPS to track assets or locate employees.

The illustrated system 100 further includes a mobility server 102. This mobility server 102 is capable of communicating with the business systems 101 and one or more mobile units 104 (only one is shown in detail). The mobility server 102 of the present invention may use any communication protocol known in the art. Some examples of such protocols include Bluetooth, WiFi (802.11x), Cellular WWAN (ED-VO, CDMA, WCDMA, GPRS, GSM), hardwired local area network (LAN), Remote Access Server (RAS), and the like. The mobile unit 104 may also dock or sync with the mobility server 102 via a wired connection e.g., o a periodic basis.

Also, the mobility server 102 communicates with an application descriptor generator 103. As such, the mobility server 102 is capable of communicating an application descriptor from the application descriptor generator 103 to any of the business systems 101 or directly to a mobile unit 104. The application descriptor generator 103 creates application descriptors, which are to be discussed more fully below.

The mobile unit 104 of the embodiment of the current system 100 includes a display 105, an input device 106, and a communications device/module 107. The illustrated mobile unit 104 may be embodied, for example, as a smartphone, a portable tabled PC, a personal digital assistant (PDA), other portable computing devices, or the like. Any suitable operating system may be employed by the mobile unit 104, and suitable processing and memory resources are provided on an application dependent basis. In the illustrated embodiment, the mobile unit 104 employs a Windows Mobile operating system with Windows CE 5.x, Microsoft .NET Compact Framework 2.0 SP2, and has 32 MB of random access memory (RAM).

The mobile unit 104 is also equipped with a communications module 107 capable of communicating with a mobility server 103. Such communication modules 107 may employ any communication technology known in the art or a custom communications technology. For example, the communications module 107 may employ Bluetooth, WiFi (802.11x), Cellular WWAN (ED-VO, CDMA, WCDMA, GPRS, GSM), hardwired local area network (LAN), Remote Access Server (RAS). Alternatively, the communications module 107 may include a connection to the mobility server 103 via USB or cradle using an ActiveSync or other process.

The input device 106 of the mobile unit 104 is capable of collecting data from a user. The input device 106 can consist of any input device or combinations of input devices known in the art such as a trackball, a barcode reader, RFID scanner, touch screen, alphanumeric keys, or the like. Additionally, the mobile unit 104 of the present embodiment is equipped with a display 105 for displaying a user interface. The display 105 can be of any type in known in the art, including an LCD display, and may employ other features such as a touch screen, a mouse and pointer style user interface, scrollable text fields, and the like.

The illustrated mobile unit 104 includes a client 108. The client 108 is a computer program operative to control the operation of the mobile unit 104. The client 108 is also operative to read and interpret an application descriptor 112 that can define application functionality. In one embodiment of the present invention, the client 108 consists of a C# program running on the processor of the mobile unit 104. The client 108 of the present embodiment is resident on the mobile unit 104 and stored in memory on the mobile unit 104.

The client 108 of the present embodiment employs a Mode/View/Controller architecture. The model 109 manages the logical operation of the application descriptor 112 and the response 113. The view 110 manages the display of the model 109 on the display 105. The controller 111 manages the interplay between the view 110 and the model 109.

An application descriptor 112 is transmitted via the mobility server 102 to the mobile unit 104. The client is operative to launch an application (e.g. 114, 115), wherein the application descriptor 112 is loaded into the model 109 of the particular application (114, 115). Also, a response 113 to the mobility server 102 is also loaded into the model 109 of the particular application (114, 115). The client 108 interprets the application descriptor 112 in order to produce and control the functionality of the mobile unit 104 as will be explained further below. In this embodiment, the application descriptor 112 is an Extensible Markup Language (XML) document including self-describing data. For example, the data may be described in metadata in the form of XML tags. The client 108 is operative to interpret the data elements contained in the application descriptor 112, including interpreting the metadata in conjunction with the data content in order to provide the desired functionality of the client 108.

Generally, as stated above, the application descriptor 112 defines the functionality of an application running on the client 108. In that regard, different applications can be achieved using a single client 108. Thus, multiple applications can be achieved on the same device using a single client, and different applications, with varying functionality, disparate objectives, and tailored process flows, can be provided using the same client 108. As the functionality is defined by the application descriptor 112, which may be communicated to the client 108 any time a connection is established, there is no need to tailor, provide, and install differing clients with differing functionality. In this regard, the embodiment of the present invention provides a scalable and highly adaptable application in that the application can be configured, tailored, and otherwise modified with each transmission of an application descriptor 112 without the need to provide different client software on the mobile unit. Additionally, this allows updates to an application (114, 115) to be made with any of the transmissions of the application descriptor without the need to update the client 108 software.

To that end, the client 108 is operative to interpret an application descriptor 112 and generate an application (114, 115). The application (114, 115) generates and displays at least one form. The forms generated and displayed by the application may consist of one or more forms, where the forms are described and defined by the application descriptor 112. Additionally, the application (114, 115) of the present embodiment provides a way to navigate through the forms, wherein the forms correspond to task to be performed by a user and the navigation allows the user to navigate to the appropriate form when the form as needed by the user to perform a business task.

In one embodiment, this navigation through the forms follows sequential, repetitive tasks to be performed by a user. Therefore, "next" and "previous" commands are provided to allow a user to navigate sequentially through the forms as they complete business task in a repetitive order. In another embodiment, the repetitive business tasks to be performed by a user involve performing optional tasks or tasks of varying complexity based on varying situations. In this regard, linking navigation may be provided, wherein the navigation of a form may not follow a set, sequential order, but may rather be dependent on linking relationships. These linking relationships between forms are explained in further detail below. In yet another embodiment, the tasks to be performed by a user may involve the need to navigate to a plurality of forms in an ad hoc fashion, wherein the navigation to a form is non-sequential and follows no dependent relationship to another form. In other words, there may be a form the user needs to access randomly or be able to navigate to from any other form. Therefore, an ad hoc navigation feature is provided in an embodiment of the present method.

Figure 2:
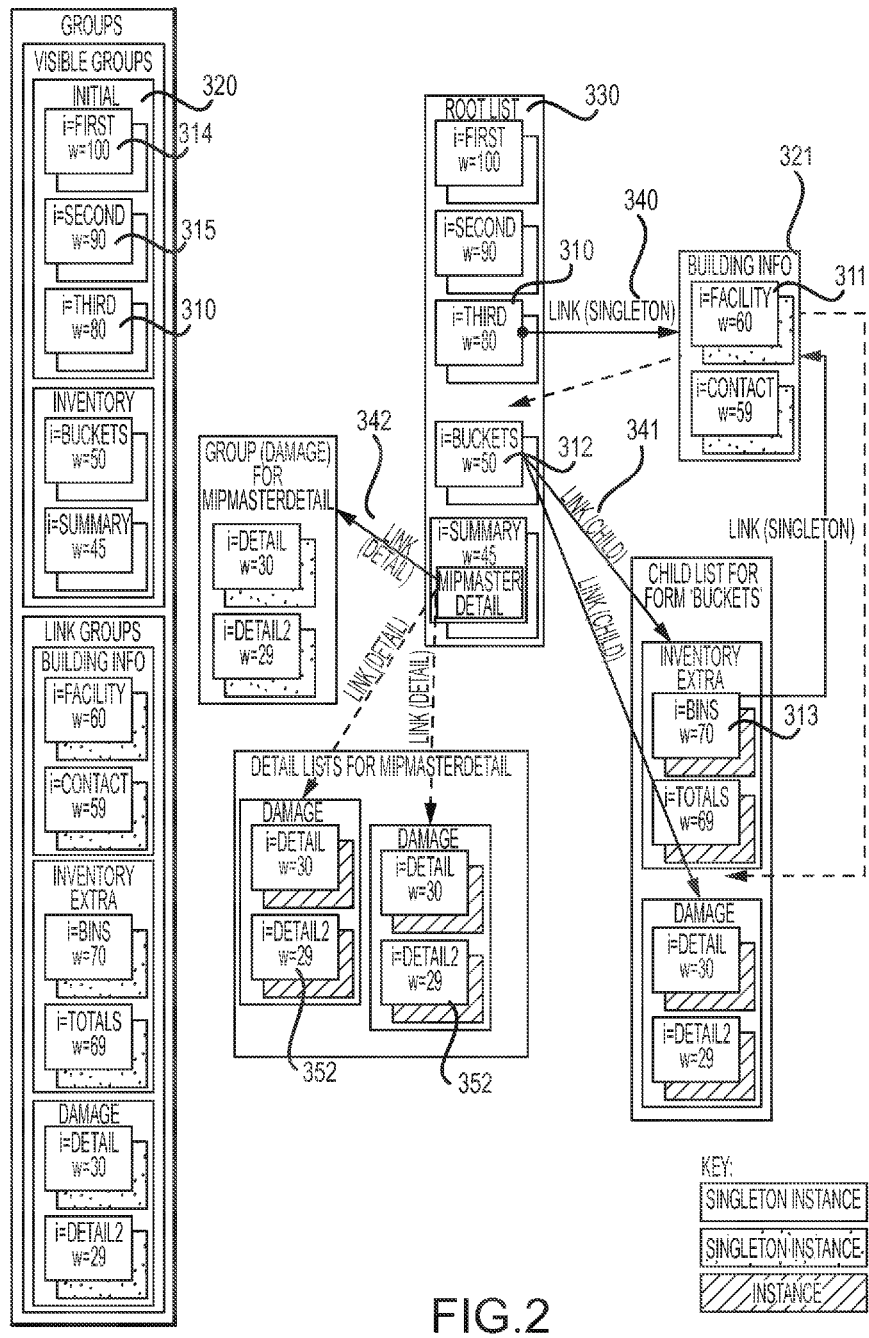
FIG. 2 illustrates a set of form lists in accordance with the present invention.
Figure 3:
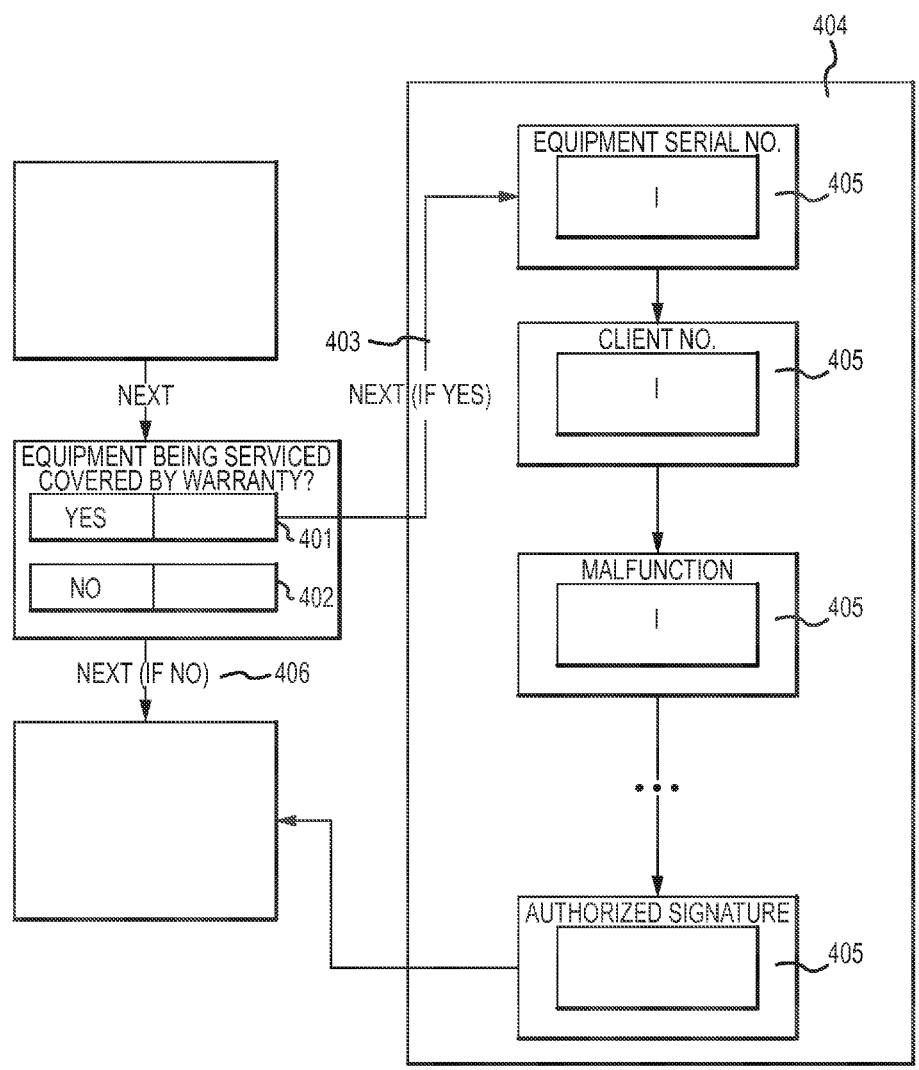
FIG. 3 illustrates an example of navigating between form lists in accordance with the present invention.

Referring to FIG. 2, each form (e.g. 310, 311) is described in the application descriptor 112. Associated with the description of each form is an identity (i) and a weight (w). In FIG. 3, the identity of each form is shown as i="Identity." Additionally, the weight of each form is shown as w="weight." Therefore, form 310 has an identity of "Third" (depicted as i=Third) and form 311 has a weight of 80 (depicted as w=80). The depiction of each form identity and weight follows the above example. As discussed below, those identities and weights are useful in navigating through a work flow process. The identity and weight of each form is described by the metadata of the application descriptor 112, which contains data elements associated with the makeup of the form itself.

Additionally, FIG. 2 shows multiple forms (e.g. 310, 311) organized into form groups, or simply groups (e.g., 320, 321). A group is defined as a group of forms. It is assumed that forms in the same group are somehow related; however this does not need to be true to realize the present invention. An example of a group is the group 320, or "Initial" group in FIG. 2. The group 320 consists of the forms 314, 315, and 310.

Each form group (e.g., 320, 321) has associated with it a form list. A form list is a logical representation of a form group and determines the sequential order that forms in a group are displayed and navigated in the application. The form list is generated by comparing the form weights of all the forms in a form group and organizing the forms such that the highest weight form is sequentially ahead of the next lowest form weight. Assuming that no links are activated to select an alternate work flow process, a form list determines the order that the client navigates through the forms. In the illustrated embodiment, the user is presented with at least two navigation commands, such that a user may select "next" or "previous." Next will navigate, in default operation, to the next lowest weight form in the form list. Previous will navigate, in default operation, to the next highest weight form in the form list.

Also, the client 108 maintains, for each application, two parameters, the root list and the current list. The root list is a single form list defined by the application descriptor. The current list is a parameter maintained in the client 108, where the actively displayed form's list is set as the current list. The root list represents the highest hierarchal list defined in the application descriptor 112. Upon startup of an application, the root list is also set as the current list. However, if as described below, the user navigates away from the root group, the list of the group the user navigates to is set as the current list.

Each form (e.g. 310, 311) may contain links (e.g. 340, 341, 342) and components (350), wherein the links (340, 341, 342) and components 350 contained in each form are described by the application descriptor 112. Components 350 define an actual control, such as text box, check box, button, or the like and are responsive to a user. Links (340, 341, 342) define alternative process flow structures that can be defined by linking one form to a different form or group of forms. The flow of the application may be changed according to links contained in one or more forms.

A component 350 also has an attribute value contained in metadata of the application descriptor 112 that describes the component 350 to be used on the form. Associated with the client 108 is a component pool 360 that is used to generate each form (e.g. 310, 311, 312). Accordingly, when the client 108 builds each form, the application descriptor 112 defines the component attribute value to be used. The client 108 then retrieves that component 350 from the component pool 360 and uses it to build the form. Similarly, the client 108 employs modules used to evaluate the component 350. The application descriptor defines what module in the client controls the logical operation of the component 350. Based on the function associated with the component 350, the model module evaluating the component 350 the component 350 is operative to perform an operation. This operation may include a variety of tasks, including using the component 350 to perform some logical operation, collecting data, control application functionality, etc. The attribute value, evaluation module, and other data associated with each component are provided in the application descriptor 112 in the form of data elements and metadata. The client 108 is further operative to visually lay out and size components to a form and display the form on the display 105 of the mobile unit 104.

An example of a component 350 associated with an embodiment of the present invention is a text box displayed on a form. The application descriptor 112 defines the component as a text box by setting the component attribute in the metadata containing the component information to the attribute associated with the text box in the component pool. In response, the client 108 interprets this attribute and retrieves the text box component from the pool of components stored in the client. The client would render the form, including the text box using the data elements and metadata describing the text box. The user may activate the text box and input a string of text. When the form is used, the model 109 processes the input provided in the text box using the appropriate evaluation module defined by the application descriptor 112 in metadata associated with the text box. One of the many possible actions the evaluation module can take, depending upon which module was defined in the application descriptor to evaluate the component, could be to enter the input text string in the response as an element with metadata. The tag may provide data as to what form or component generated the text string, among other possible data, such as the user who input the text string and at what time the text string was input. Alternatively, the input to the text box may be evaluated logically to determine if a link is valid, or perform some other logical operation dependent on the input of the text box.

In one embodiment of the present invention, a form may also include links. Links from one form to another form are used to establish the branching logic associated with the present embodiment. A link (340, 341, 342) can control navigation between forms (310, 311, 312). As mentioned previously, in default operation, the weight assigned each form by the application descriptor 112 defines the order that forms are presented to the user, with the user navigating between these forms using next and previous commands. However, if a form contains a link, that link may divert the process flow interrupting the normal sequencing of forms in the form list. Three possible link types exist in this embodiment. They include singleton links 211, child links 212, and detail links 213.

Generally, a link (340, 341, 342) in a form causes a next command from the user to, instead of navigating to the next lowest weight form in the current list, to instead change the current list to the target list of the link. Put another way, as shown in FIG. 2, the form "Third" 310 is contained in the group "Initial". The "Initial" group 320 is defined as the Root List 330 containing each form in the "Initial" group 320 and organized in descending weight order. Form "Third" 310 also contains a singleton link 340 to the "Facility" form 311, contained in the "Building Info" group 321. The form list associated with the "Building Info" group 321, arranges all forms in the "Building Info" group 321 in descending weight order of the forms within that group. A link from "Third" 310, which validates as true, will cause a next command to change the current list from the Root List to the "Building Info" group's 321 form list, and instead of the "Buckets" form 312 being displayed, as it would have if "Third" 310 had not contained a link, "Facility" 311 is displayed. Subsequent next commands would cause the client to navigate through descending weighted forms in the "Building Info" group 321 until the lowest weight form in that group is navigated away from or a form in that group contains a valid link. Once the user navigates through the forms in the "Building Info" group 321, a next command navigates to the group containing the original link, the current form is reset from the "Building Info" group's 321 list to the Root List 330, and the display of the forms contained in the Root List are once again displayed in descending weight order.

It is also understood that in one embodiment of the present invention, multiple layers of links may be realized. That is to say a form in the root group may contain a link to a child form group. Therefore, the root group becomes the parent group. Additionally, the child form group may contain a form with a link to another child form, wherein the root group becomes the grandparent form group. Therefore, navigation can be diverted to various levels of groups, as is depicted in FIG. 3. That is, a form contained in a child group may have a valid link as well. Therefore, the link from the child form, e.g. "Bins" 313, would link to the "Building Info" group 321. As can be appreciated, many layers of links and child/parent/grandparent forms may be realized using this technique.

The first available type of link in the present embodiment is a singleton link 340 that defines a link wherein the child form, "Facility" 311 in the example above, contains the same data regardless of the identity of the parent form. To that end, assuming there is another form, e.g. "Bins" 313, that also contains a singleton link to "Facility" 311, the data contained in "Facility" 311 will be the same regardless of whether linked to from "Third" 310 or "Bins" 313.

The next type of link available in an embodiment of the method is a child link 341. A child link 341 causes a new form list to be created. The new list, or child list is owned by the parent list that created the child list. This new form list contains data that is unique to the parent form. Therefore, unlike a group linked with a singleton link, a group created with a child link is a unique group with unique data associated with the group created by the parent form. That is, while a child link may link to a form structure, each link creates a unique form group, that may have identical form layout, but contain unique data depending on the parent form that linked to the child form.

Lastly, in the present embodiment, a detail link can be created 342. A detail link 342 represents a link from a component 350. The creation of a detail link 342 from a component 350 allows for a component 350 to manage a list of detail information, with each detail defining a distinct record or row (e.g. 351, 352).

The links (340, 341, 342) created on a form in the application descriptor (112) are evaluated by the client 108 to determine if the link is valid. As such, links may be logically evaluated to determine if the link is valid or invalid. One such application of valid and invalid links in the present embodiment would be to streamline a process flow. In that regard, a form may contain a link to forms associated with tasks for collecting data regarding a process that a user may or may not need to perform. Therefore, if a user input or other variable when interpreted by the client 108 causes a link to be invalid, and thus inactive the user will have to navigate through forms that are not useful or needed.

An example of invalidating a link to streamline a process flow of the present embodiment could be realized in a technician making a service call and is depicted in FIG. 3. A warranty form 400 requires the user input whether the equipment to be serviced is under warranty. To accomplish this, two components, a "yes" check box 401 and a "no" check box 402 are provided. The technician's response can either be to check the "yes" or "no" check boxes (401, 402). The module defined by the application descriptor 112 to evaluate the checkbox component evaluates a checked "yes" box by the user. The evaluation may include a logical operation that causes a link 403 associated with the form to be valid when the "yes" box is checked such that the client would navigate to a child group 404 of forms 405 containing information and prompts that correspond to the warranty information of the current equipment. Conversely, a "no" response may be evaluated by the module and cause the link to be invalid when "no" is checked such that the client would continue to the next form following the sequential order of the root list 406, effectively bypassing the warranty forms 405. This ensures efficient use of the forms within the application descriptor and eliminates the need for the user to navigate sequentially through unused forms. While a technician making a service call was used to demonstrate this functionality of the present invention, it is to be understood that the functionality is generic to the application descriptor and can be used in any potential task. Additionally, the dependency of the links and responses capable of being selected by the user may be much more diverse than those used above as an example.

All forms, groups, lists, components, and links are defined in the application descriptor 112. Metadata tags in the XML document define groups, forms, components, and links.

In the embodiment described above, generally three navigational methods are employed by the client to navigate through process flows consisting of various forms. These three navigational methods can be described as sequential navigation, linking navigation, and ad hoc navigation. Sequential navigation includes using a "next" or "previous" command to navigate from a form to the next lower weight form in that list (with a next command) or the next higher weight form in that list (with a previous command). Linking navigation can be defined as following a valid link from one form to a form contained in a different group, thusly having a different list associated with it. Finally, ad hoc navigation is defined as using a "Goto" command.

In addition, the application descriptor 112 may allow a "Goto" function to be employed. Associated with each form list in the application descriptor is an attribute that defines whether the form list described is to be included in a "Goto" list. A user may access a "Goto" list in a menu or submenu. Listed in the Goto menu are the forms with the appropriate attribute in the application descriptor that instructs the client to provide the form in the list. When a user selects a form list from the "Goto" menu, that form is built and displayed and the form list associated with that form's group is loaded as the current list. Thus, the "Goto" menu allows for navigation to any of the designated form lists available in the "Goto" menu in an ad hoc fashion by the user.

The client 108 may also allow multiple applications to run simultaneously. Both applications may be displayed simultaneously (e.g., in picture-in-picture or side-by-side fashion) or only a single application may be displayed at a time. In the latter case, while an application may lose display focus on the display 101, the information with regard to current form and current form list will remain active in the client 108. This allows the user to toggle display focus between applications without losing the current form list and navigational position within the application when display focus is diverted to another application.

Figure 4:
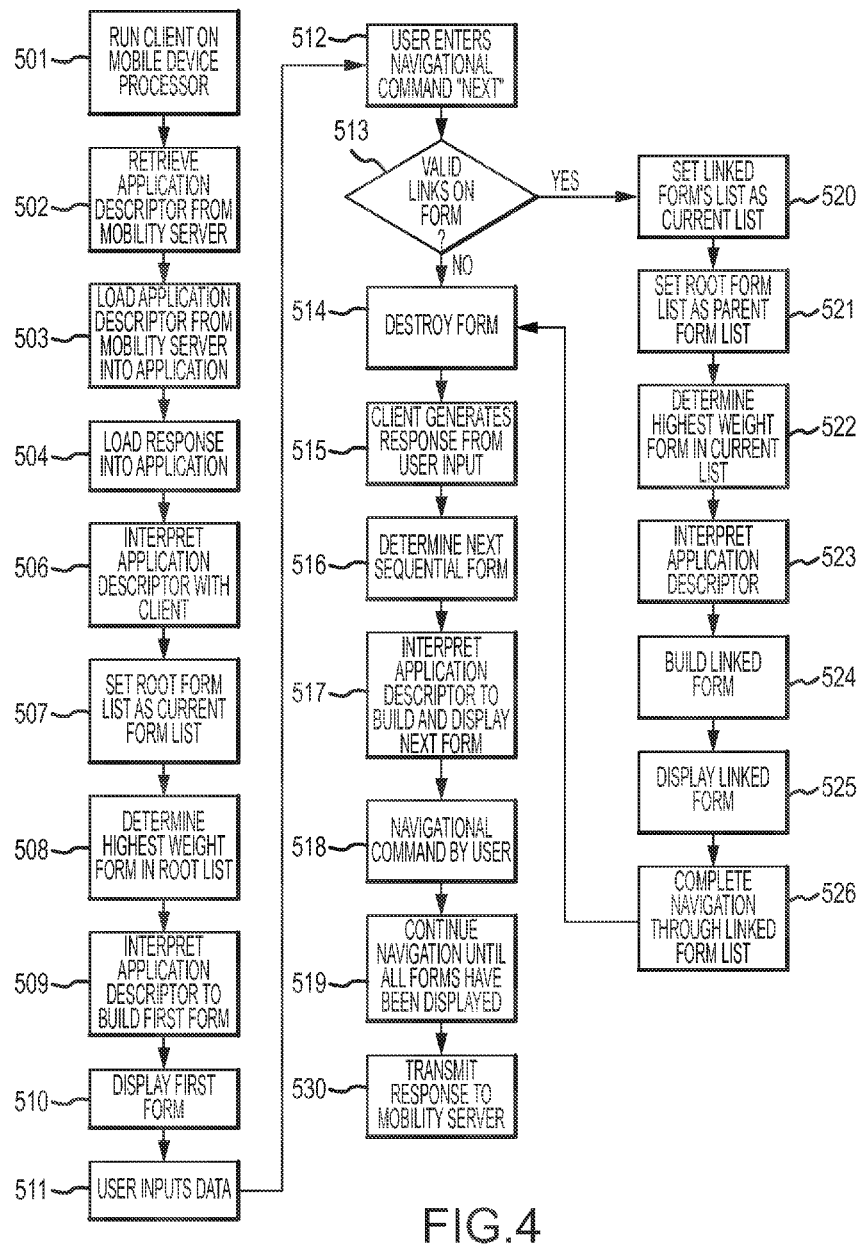
FIG. 4 is a flowchart illustrating a mobile application process in accordance with the present invention.

The operation of the current embodiment will be explained and is depicted in a flow chart in FIG. 4. The operation begins when the client 108, resident on a mobile unit 104 is retrieved from memory and begins running (501) on the processor of the mobile unit 104. The client causes the mobile unit 104 to retrieve (502) an application descriptor 112 from a mobility server 102. The application descriptor 112 is loaded (503) into an application (114, 115) established by the client 108 at 503 and a response 113 is loaded (504) into the application (114, 115) as well.

The client 108 then begins (506) to interpret the application descriptor 112 in order to establish the application's (114, 115) functionality. The client 108 sets (507) the root form list as the current form list. Accordingly, the highest weight form in the root form list is determined (508). The highest weight form in the root list is to be the first form displayed. Again, the weight of each form is included in metadata regarding the form information.

In order to display the first form, the client 108 interprets (509) the metadata associated with the form to determine what data, components, and links the form will contain. The client clears the current display of the mobile unit and retrieves the application descriptor information for the new form, including the component information. The client loops through all component information in the application descriptor. For each component, the client retrieves the component from the component pool and associates the component with descriptor information. This includes determining the module to evaluate the component and the appropriate response information the component may generate. The component is then added to the form. The components of the form are visually laid out and sized to the form. The form is then displayed (510) on the display of the mobile unit.

A user then inputs (511) data using the input of the mobile unit. This input can be in the form of inputting text via alphanumeric keys, a barcode number via a bar code reader, or any other type of business data the user may have. Additionally, while FIG. 4 depicts collecting data from a user, it is also to be understood that at this point in the operation of the mobile unit, the form displayed may only contain display data used by the user without associated input. That is to say, inputting data is an optional step in that the user may progress directly to a navigational command without inputting other data.

In either instance, the operation continues with the user entering (512) a navigational command, such as a next or previous command. Once a navigational command is received, the client determines (513) if a valid link is associated with the form. If a valid link is found, then the operation continues to process step 520, otherwise the operation continues to process step 514.

If there is no valid link, the client destroys (514) the form. By destruction of the form, it is meant that the client clears the component information from the current form including information such as the module to evaluate the component and the appropriate response information the component may generate. The client then loops through each component of the form, clearing each component's form specific information and returning the component to the pool of components. The components are then cleared from the form and the descriptor information is cleared. In connection with the destruction of the form, any input data that has been received by the user is used to generate (515) response data including response metadata. That is to say, the actual text string or other type of input of the various components of the form may be entered into the response, along with metadata used to describe the data including, for example, the identity of the user who input the data, the time the data was input, the form into which the data was input, the component from which the data was generated, or any other data associated with the input that may be associated with the input data.

The client then determines (516) the next form to be displayed. Again, assuming no valid links were activated on the previous form, the client will determine the next lowest weight form in the group. The client follows the same steps as before to build and display (517) the next form. The user may or may not input data in the new form and then navigates (518) away from that form. This process is repeated until all forms associated with the application descriptor or navigated to by the user have been displayed to the user.

Alternatively, at 514, if a link on a form is valid, the client sets (520 and 521) the current list as the parent list and the linked to list as the new current list. Thereafter, the determining (522), building (523), and displaying (524) steps are carried out in the same way as steps 508, 509, and 510. The client then navigates (525) through the forms of the child group. Once all desired forms in the child group have been displayed, the client navigates back to the next lowest weight form in the parent list, setting the parent list as the current list once again. While not depicted in FIG. 5, it is to be understood that the linking steps 520-525 may be carried out in a child group, such that the root group of forms becomes a grandparent group. Moreover subsequent layers of links and child form groups can be established to provide multiple layers and braches of form groups.

Once the process flow reaches the last form of the application, the mobile unit connects to a mobility server and transmits (530) the generated response to the mobility server.

In another embodiment, two applications run simultaneously within a single client on a single mobile unit. In that instance, the operation of either of the applications is similar to that in FIG. 4, except that each application runs all steps in FIG. 4 separately. Additionally, when two applications are running on the same client, only one application is displayed on the display of the mobile unit at any one time. However, while the application that loses display focus (that is to say, the application not being currently displayed) the current form and current form list are all retained in memory, such that the application that loses display focus is uninterrupted. Accordingly, when display focus is shifted back to the non-displayed application, that application will resume without any interruption in the process flow that would have occurred had the application never lost display focus. Alternatively, both applications may be displayed simultaneously, e.g., in picture-in-picture or side-by-side mode. In that case, both displays may be active (e.g., available for receiving inputs) simultaneously or a user may toggle between active displays, e.g., using a cursor. Additionally, the client of the present invention is capable of running one, two, or more applications in this manner, wherein when an application loses display focus, the application is not interrupted.

Figure 5:
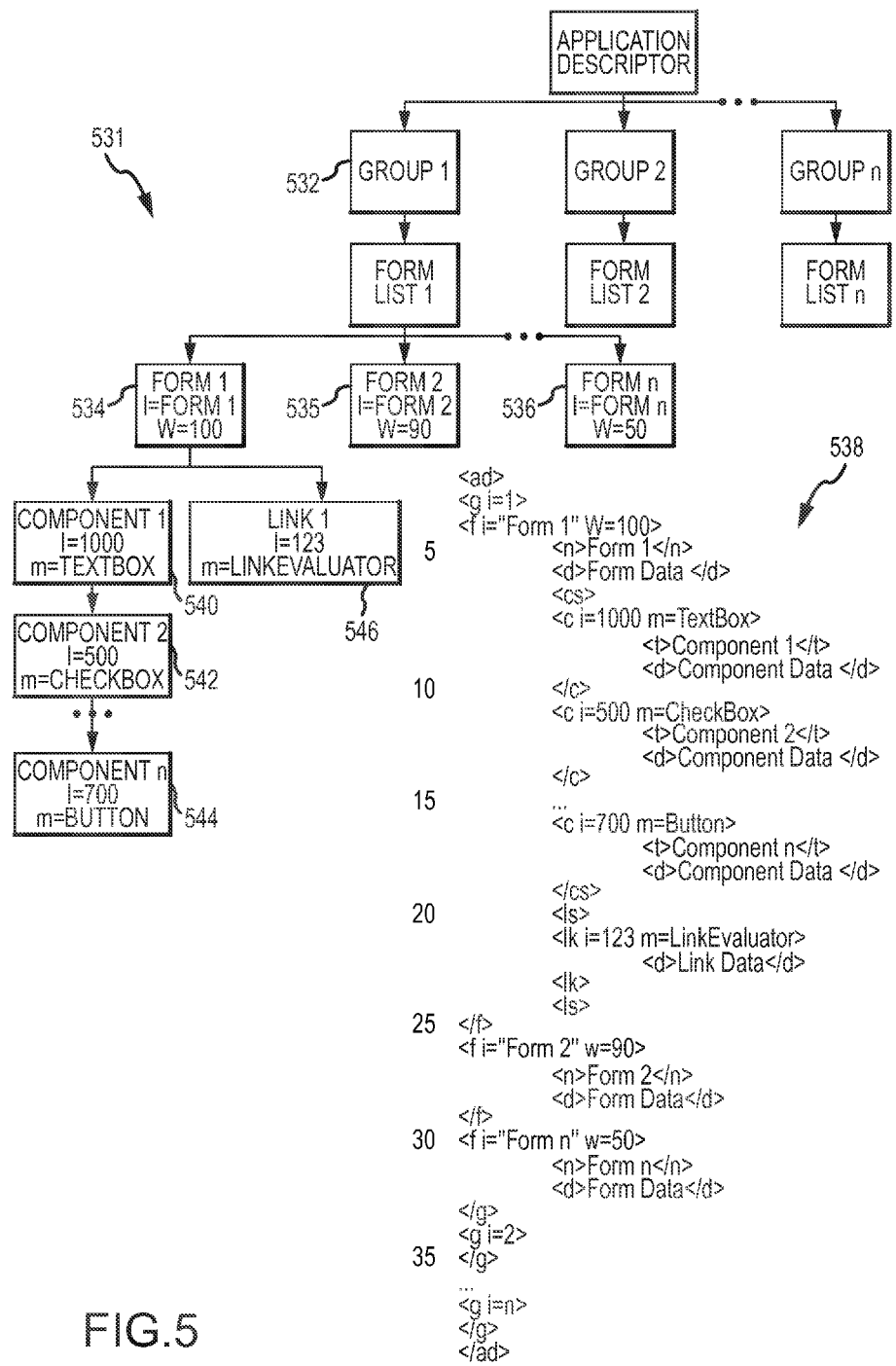
FIG. 5 is a flowchart illustrating an example application descriptor structure with accompanying application descriptor text corresponding to the depicted structure.

FIG. 5 shows an example application descriptor structure 531 in the form of a flowchart along with the accompanying application descriptor text 538 defining the pictured structure 531. It will be appreciated that in generating an application descriptor structure 531, one would consult with the particular entity requiring the application to understand that entity's process. This would require understanding, among other things, the entity's process flow, the requisite data that is to be provided to and collected from the user, and the necessary response data to be integrated into the entity's existing business processes. With the knowledge of the particular business processes, an application descriptor structure can be generated.

As shown in FIG. 5, in one embodiment of an application descriptor structure 531, the structure is generally composed of groups, lists, and forms. Each group of the application descriptor may correspond to a specific business task, with each form representing a sub-step of that particular task. Alternatively, it is to be appreciated that the group may represent a sub-step of a single business task. Moreover, it can be appreciated that the requisite information to be collected by the user may require use of certain components operative to collect this data. Also, once the business process is understood, links may be provided on each form to efficiently navigate between forms, allowing the user to navigate through as many forms as necessary to complete the task while not having to navigate through superfluous forms that may not be needed to complete the task.

For purposes of illustration, FIG. 5 has a number (n) of groups, with each group representing, for example, a single task to be performed by the user. For instance, Group 1 (532) may correspond to the first task a user is to perform. Further, Form 1 (534), Form 2 (535), and Form n (536) may correspond to sub-steps necessary to carry out the task of Group 1. Further still, Component 1 (540), Component 2 (542), and Component n (544) may correspond to three data values required to be collected to accomplish the sub-step represented by Form 1 (534). Also, Link 1 (546) may provide logic associated with the first sub-step, wherein according to the responses gathered by the components (540, 542, 544) may require additional sub-steps. Therefore, according to the responses provided (540, 542 and 544), Link 1 (546) may provide a link to additional forms to inquire as to further information associated with the present sub-step.

According to this structure 531, a descriptor 538 is generated. As can be appreciated from the provided application descriptor text, Group 1 is identified in line 2 as a new group with an identifier of "1." Contained within the Group 1 element are the corresponding forms (534, 535, and 536) as described above, and defined in lines 3, 26, and 30 respectively. Within each tag defining the beginning of a new form is metadata including in this example the form identity "i" and the form weight "w." In line 33, it is indicated that Group 1's definition is complete. Furthermore, the definition of Form 1 is illustrated in lines 3-25. Components 513, 514, and 515 are each defined starting on lines 7, 11, and 16 respectively. As can be appreciated from FIG. 5, each component has associated metadata contained in the tag indicating each new component. For example in line 7, Component 1 is identified as "1000" and is defined as being evaluated by the "TextBox" evaluator of the client. Also, Link 1 is defined in the descriptor in lines 20-24. As can be seen, the Link has an identity of "123" and is evaluated by the "LinkEvaluator" of the client.

Figure 6:
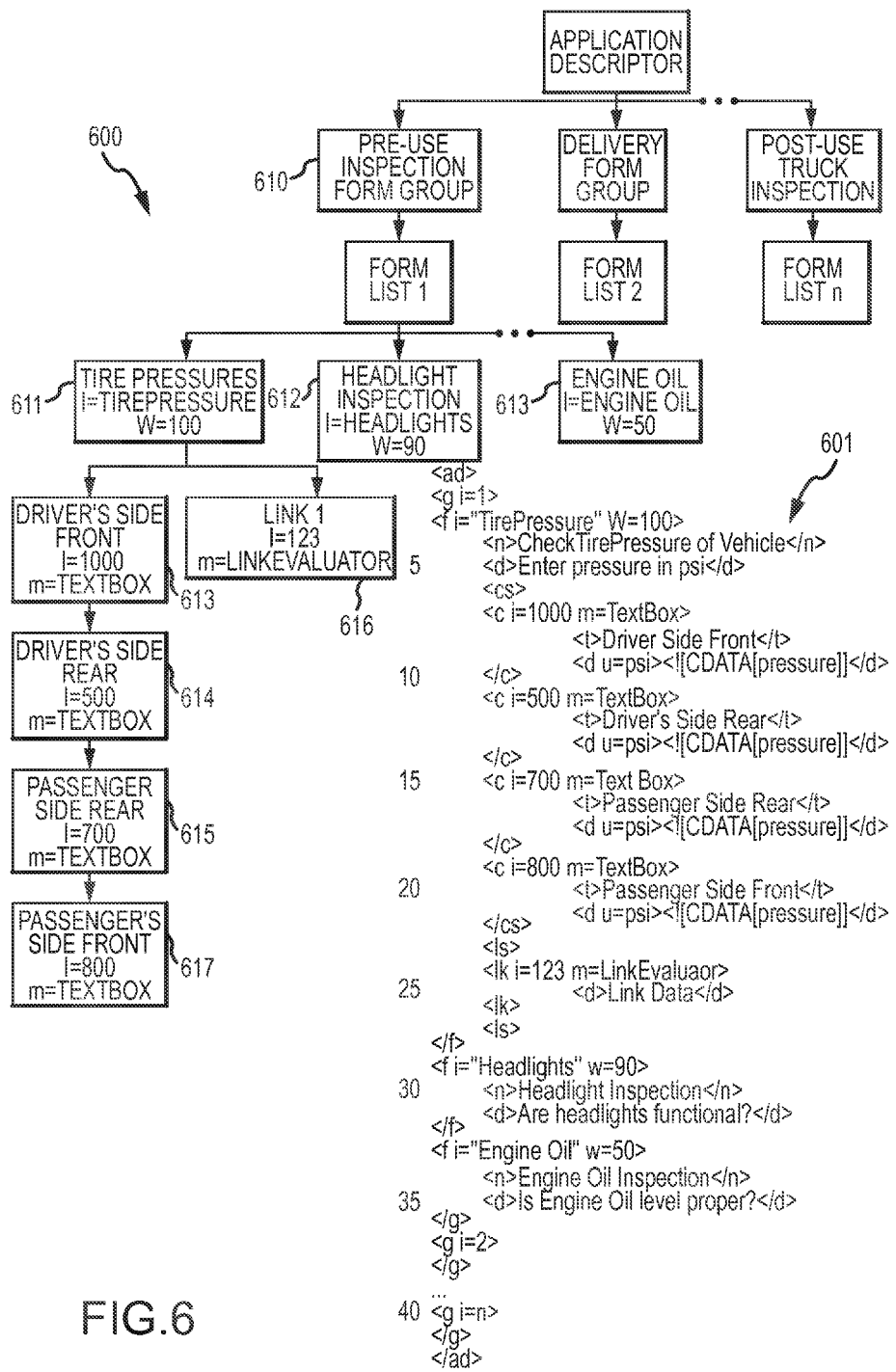
FIG. 6 is an alternative flowchart and application descriptor as in FIG. 5 with exemplary business tasks represented.

FIG. 6 shows an alternative embodiment wherein a specific application descriptor structure 600 and a specific application descriptor text 601 have been defined. As can be gathered from the application descriptor structure 600, the first task of the user is to complete a pre-use truck inspection 610. Therefore, the first group is a "Pre-Use Inspection Form Group" 610 and contains forms (611, 612, 613) representing the individual sub-steps necessary to complete the pre-use inspection. In this illustration, there are three sub-steps; therefore, three forms (611, 612, 613) are provided. The first of these forms, "TirePressures" 611 includes four components (513, 514, 515, 517), each component corresponding to each tire of the vehicle. Referring to the application descriptor text, these components are defined in lines 7-23. Each component has an identifier "i" and an evaluator "m." Moreover, each component has associated with it text defined by the <t> tag which would correspond to text displayed with the component. Also are data fields indicated by the <d> tag. Each <d> tag for these particular components also has metadata "u=psi." This may be used to indicate what units the data have associated with them. In this instance "psi" may indicate the entered values are values representing pounds per square inch. Also, defined in the specific application descriptor structure 600 is a link 616 associate with the "TirePressure" form 611. One exemplary use of the link 616 may be to evaluate if any of the entered data values in the components (613, 614, 615, 617) are below a minimum value. If so, the link 616 may evaluate as true, causing a navigational command to proceed to a form that may display a warning and require positive response that the low-pressure situation was correctly remedied.

As can be appreciated in studying FIG. 5 and FIG. 6 the use of the application descriptor structures (531, 600) facilitates rapid changes and development for business processes. Different entities employing mobile devices to facilitate business tasks have differing needs in the form of varying business process flows and required data to be transmitted and received. Accordingly, the use of an application descriptor structure (531, 600) allows for rapid development to accommodate these various business tasks. Moreover, each transmission of an application descriptor provides the client information detailing the functionality. Therefore, for instance, if a business begins to provide a new service or needs to respond to a change that requires a change in process flow, a new application descriptor embodying that changed process flow can transmitted to each client any time there is connectivity with the mobility server. In that regard, business processes may be changed in real time without requiring extensive updates of client software resident on the mobile device.

Further still, this adaptability and rapid development is accomplished while maintaining the ability to employ complex branching logic, ensuring a streamlined and efficient process flow. This complex branching logic is also adaptable in that all branching is accomplished via links that are themselves defined in the application descriptor. In that regard, the advantages described above with regard to adaptability and rapid development also hold true with regard to the ability to rapidly change and update the branching logic employed.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A method for use in controlling operation of a mobile unit, said mobile unit being associated with a mobility server operative for disseminating application descriptors that describe a functionality of an application for execution at one or more mobile units, said method comprising the steps of:
    providing a client, resident on a mobile unit, for receiving an application descriptor from said mobility server and, responsive to receipt of said application descriptor, establishing said application having said functionality, wherein said functionality is described by said application descriptor;
    establishing with said client a root form list, of one or more forms, defining the default process flow structure for navigating through said application, said root form list having a data content, including associated data structures, defined by said application descriptor; and
    establishing with said client a child form list, of one or more forms, defining an alternative process flow structure for navigating through said application, said child form list having a data content, including said associated data structures, defined by said application descriptor;
    wherein said client is responsive to said application descriptor to establish said root form list such that said root form list has a data content that is independent of a linking relationship for accessing said child form list as defined by said application descriptor.

2. A method as set forth in claim 1, wherein said client is responsive to said application descriptor to allow multiple parent forms to link to said child form list and a data content of said child form list varies depending on which said parent form links to said child form list, wherein said linking is defined in the application descriptor.

3. A method as set forth in claim 1, wherein said client is responsive to said application descriptor to allow a parent form to have multiple links creating multiple child form lists, each of said multiple child form lists having a content defined by said application descriptor.

4. A method as set forth in claim 1, wherein said client is further responsive to said application descriptor for linking said child form list to said root form list.

5. A method as set forth in claim 1, wherein said client is responsive to said application descriptor to establish one or more detail links from a component to multiple detail form lists, where said detail form lists describe detail information of said component and the data content of each said detail form list varies depending on each said detail link.

6. A method as set forth in claim 5, further comprising the steps of using said root form list and a series of child form lists and said detail form lists defined by said application descriptor to receive and store input data, and issuing a response, to said mobility server, including said input data, wherein said response further includes metadata, related to said default and alternative process flow structures, describing said input data.

7. A method as set forth in claim 6, wherein said response is stored in persistive memory in said device prior to issuing to said mobility server.

8. A method as set forth in claim 6, wherein said input data determines said alternative process flow structure that varies from said default process flow structure, based on said application descriptor.

9. A method as set forth in claim 1, further compromising the steps:
    navigating from a first form to a second form, wherein said first and second form are in different groups.

* * * * *

UNITED STATES PATENT AND TRADEMARK OFFICE
CERTIFICATE OF CORRECTION

| | | |
|---|---|---|
| PATENT NO. | : 8,126,924 B1 | Page 1 of 1 |
| APPLICATION NO. | : 12/176992 | |
| DATED | : February 28, 2012 | |
| INVENTOR(S) | : Herin | |

It is certified that error appears in the above-identified patent and that said Letters Patent is hereby corrected as shown below:

Column 16, line 61, delete "compromising" and insert therefor --comprising--.

Signed and Sealed this
Tenth Day of April, 2012

David J. Kappos
*Director of the United States Patent and Trademark Office*